US006822361B1

(12) United States Patent
Roschin et al.

(10) Patent No.: US 6,822,361 B1
(45) Date of Patent: Nov. 23, 2004

(54) ORBITING MULTI-ROTOR HOMOPOLAR SYSTEM

(75) Inventors: Vladimir Vitalievich Roschin, Moscow (RU); Sergi Mikhailovich Godin, Moscow (RU)

(73) Assignee: Energy & Propulsion Systems LLC, Valencia, CA (US)

( * ) Notice: Subject to any disclaimer, the term of this patent is extended or adjusted under 35 U.S.C. 154(b) by 0 days.

(21) Appl. No.: 10/673,022

(22) Filed: Sep. 27, 2003

Related U.S. Application Data

(60) Provisional application No. 60/414,560, filed on Sep. 30, 2002.

(51) Int. Cl.[7] ............................................. H02K 31/00
(52) U.S. Cl. ....................................... 310/178; 310/114
(58) Field of Search ................................ 310/114, 115, 310/178

(56) References Cited

U.S. PATENT DOCUMENTS

| ,406,068 A | 7/1889 | Tesla ............................. 310/178 |
| ,645,943 A | 3/1900 | Dalen et al. ................ 310/178 |
| 3,185,877 A | 5/1965 | Sears ............................ 310/115 |
| 3,465,187 A | 9/1969 | Breaux ......................... 310/178 |
| 5,241,232 A | 8/1993 | Reed ............................. 310/178 |
| 5,278,470 A | 1/1994 | Neag ............................ 310/178 |
| 5,977,684 A | 11/1999 | Lin ............................... 310/268 |
| 6,051,905 A | 4/2000 | Clark ............................ 310/178 |

FOREIGN PATENT DOCUMENTS

| GB | 2094066 | * 9/1982 | ............ H02K/7/08 |
| JP | 2000-324786 | * 11/2000 | .......... H02K/31/02 |
| JP | 2001-286117 | * 10/2001 | .......... H02K/31/02 |
| JP | 2003-47226 | * 2/2004 | .......... H02K/31/02 |

\* cited by examiner

*Primary Examiner*—Burton Mullins
(74) *Attorney, Agent, or Firm*—Our Pal LLC

(57) ABSTRACT

An orbiting multi-rotor homopolar machine employs axially parallel, cylindrical, electrically conductive magnets arranged circumferentially around vertical axis of central stator ring, intimately contacting and engaging non-slip rolling between rotor magnets and stator. A bearing rotatably secures each end of each magnet to a corresponding electrically conductive circular endplate, each slightly wider than the stator. An electrically conductive axle located in the center of the stator rigidly attaches to one of the top circular endplate, and an electrically insulating bearing means attaches the center of bottom circular endplate to a coaxial inner cylinder, located between the axle and the stator.

10 Claims, 3 Drawing Sheets

US 6,822,361 B1

ORBITING MULTI-ROTOR HOMOPOLAR SYSTEM

RELATED DOCUMENT

This application is based on provisional application Ser. No. 60/414,560 filed Sep. 30, 2002 with substantially the same title and by same inventors and applicants, who hereby claim priority there from.

FIELD OF THE INVENTION

This invention relates generally to the field of direct current electrical motors and generators that operate without the need for commutation and/or rectification, and more particularly to multi-rotor homopolar machines which derive their emf (electromotive force) from co-rotational magnets and metallic disk embodiment.

BACKGROUND

Back in 1831, Michael Faraday discovered that a cylindrical magnet suspended by a string and touching a mercury bath at the bottom could generate electricity while spinning along its axis if a second electrical contact was made at the periphery of the midpoint of the magnet. His experiment was a one-piece homopolar machine since the magnet and conductor were joined together. Such Faraday generators have also been called acyclic, unipolar or homopolar generators because no commutation or alternating of the magnetic poles is necessary for this machine in order to generate electricity.

The type of electrical output is most often direct current (DC) unless specific means are designed to provide an interruption of radial conduction and thus simulate alternating current (AC). Historically, DC was championed by Thomas Edison during the early part of the 20th century while at the same time AC was championed by Nikola Tesla and George Westinghouse. In the future, DC will be coming back into style with the emergence of ambient temperature superconductive cables. Therefore, highly efficient homopolar generators will be in demand to meet the future market demand for DC electricity.

Homopolar generators usually have a single disk or drum rotating in a stationary magnetic field with sliding contacts. The sliding contacts often present high resistance however. The construction and operation of homopolar machines for electric propulsion of marine vessels or railguns for example is already well known. Such machines include motors and generators wherein electrical current flows through a conductor situated in a magnetic field during rotation of the machine rotor.

In the case of a homopolar motor, the current will develop a J×B force perpendicular to the direction of its flow through the conductor and that of the magnetic field. In the case of a homopolar generator, a voltage dependent on the rotational speed, magnetic field, and radius, is induced in a conductor moving within the magnetic field. When current is drawn from the homopolar generator, it also develops a J×B force for the same reason as with the motor but is referred to as back torque or armature reaction. General reference information including basic principles used to reduce back torque can be found in *The Homopolar Handbook* by Thomas Valone (ISBN 0-9641070-1-5).

The prior art rarely includes a one-piece homopolar machines that rotate the magnet with the disk. Even more unknown is the concept of rolling contacts. Eliminating sliding contacts is shown in the "Planetary Homopolar Generator," *IBM Technical Disklosure Bulletin*, Vol. 17, No. 6, p. 1786–87, November, 1974, H. D. Varadarajan. Using a conducting belt or rolling contacts to gather current from a magnetic field flux cutting rotor, there is an annular magnetic field through which the rotor executes a planetary motion.

The large stresses resulting from the centrifugal force of the massive, unbalanced planetary rotor is a distinct disadvantage, prohibiting high speed operation. Thus, only a low rate of rotation is possible with the IBM design.

The "Direct Current Homopolar Machine" U.S. Pat. No. 5,587,618 to Hathaway demonstrates an analogous concept of relative motion between conductive orbiting shaft and a stationary disk-shaped magnetized armature.

However, the design is a bit cumbersome to be practical. Science Applications International Corporation claims a conductive belt, dual disk "Homopolar Motor-Generator" in U.S. Pat. No. 5,241,232 to Reed that apparently reinvents the "Dynamo Electric Machine" of U.S. Pat. No. 406,968 patented by none other than Nikola Tesla in 1889 that also has two unipolar magnetized rotors connected by a conductive belt. The belted dual unipolar machines solve one of the problems that plague the field by offering two sliding contacts at the low speed surface on the axle. However, the present invention requires only one sliding contact on the axle. These conductive belt machines also demonstrate, in principle, the concept of a multi-rotor, planetary design, by the process of coordinate transformation, since relative motion is the key to the operation of a homopolar generator. The concept of rolling contact is demonstrated with the Dalen "Dynamo Electric Machine" U.S. Pat. No. 645,943, where two disks are turning in opposite directions while in contact with each other at their periphery. However, the axle of each disk must remain fixed in place whereas each axle is in orbiting motion in the present invention.

Homopolar machines can reversibly function as motors as well, such as flywheels, and used as energy storage devices. First used in transportation applications in the 1950's, flywheel powered buses were designed to have the flywheel accelerated at every stop. Composite rotors currently have been developed which can spin at very high revolutions (100,000 revolutions per second); and the speed is limited by the tensile strength of the rim of the rotor. By using a multi-rotor design, the centrifugal forces of a large disk can be greatly reduced and still maintain high-energy storage or production. By using magnetic bearings, the friction on the axis of the rotor can be reduced sufficiently so that such rotors can maintain most of the energy for several days.

The IBM Varadarajan planetary rotor is unbalanced and has a low rate of magnetic flux cutting due to its annular magnetic field design. The Hathaway direct current machine has a lot of unbalanced conductive material orbiting the central magnetized disk which limits the rotational speed.

The conductive belt designs can be subject to oxidation and slippage, even requiring a toothed timing belt on each axle as well. With most disk models of homopolar generators, as opposed to drum designs, sliding contacts are the single most important contribution of resistance inhibiting the power output of the machine. Internal resistance is the only limit to the output capability of a homopolar generator and it is important to reduce all sources of internal resistance to obtain maximum power output for a given input torque. Rather than use high resistance carbon brushes, medium resistance silver-graphite brushes or dangerous conductive liquids such as mercury, low temperature solder, or sodium-potassium, there is a need to eliminate frictional sliding contact at the high speed periphery of the magnetized rotor completely. Furthermore, rather than maintaining two sliding contacts which contribute friction and resistance, even in the rolling and belted designs, there is a need to cut the number in half to only one high current sliding contact. The present invention satisfies both of these needs.

SUMMARY

The present invention derives direct current electricity by co-rotating a plurality of magnets and a metallic disk. It comprises an improved homopolar machine with dynamically balancing, axially parallel, cylindrical, electrically conductive magnets arranged circumferentially around the vertical axis of central stator ring. Such a design can be referred to as distributed generation since each magnet rotor generates only a fraction of the current that is transmitted through the machine. Thus, the conductive bearings contacting the center of each end of the magnet rotors may carry only one tenth or less of the total current.

The multi-rotor orbiting homopolar also does not include sliding contacts at each magnetized rotor rim but instead utilizes a suitable rolling means attached separately to magnets and also to the stator ring for intimately contacting and engaging non-slip rolling between magnets and stator as they orbit around the stator. The magnetized rotors maintain rotational synchronism and equal relative position to each other with a bearing means rotatably securing the top and bottom end of each magnet to a corresponding electrically conductive circular endplate.

The electrical energy is extracted, or input if used as a motor, through contacts on the conductive stator and at the machine's electrically conductive axle located in the center of the machine while rigidly attached to the top circular endplate that rotates with all of the individually magnetized rotors. The only single, high current, moving contact that is required is an electrically conductive thrust bearing that supports the central axle. An insulating thrust bearing meanwhile separates the axle from the center of bottom circular endplate. The stator, which is of course stationary, accomplishes the second contact means through a standard electrical connection with no need for any relative motion sliding contact. The stator may be optionally magnetized in the opposite direction to the magnetized rotors in order to increase the coercive force or magnetic flux density.

The drawings constitute a part of this specification and include exemplary embodiments to the invention, which may be embodied in various forms. It is to be understood that in some instances various aspects of the invention may be shown exaggerated or enlarged to facilitate an understanding of the invention.

The Problem

The problem this invention solves is that it generates high power direct current electricity without the need for commutation and rectification, otherwise the internal resistance losses are high.

The problems with prior art devices, processes and systems can be categorized as follows.

1. Require commutation or rectification to generate direct current electricity.
2. Rely on more than one current brush which often have high speed contact.
3. Do not distribute magnetic field power generation by multi-rotor orbiting magnets in homopolar machines or systems.
4. Internal resistance losses are usually high.
5. Neither efficient nor cost effective.
6. Neither simple nor practical for most applications.

Prior Art

A preliminary limited prior art search was not commissioned but the inventor is intimately familiar with the prior art. Following are typical examples of the prior art arranged in reverse chronological order for ready reference of the reader.

11) Non-Provisional Utility U.S. Pat. No. 6,051,905 issued to Richard Clark on Apr. 18, 2000 for "Homopolar Generator"

10) Non-Provisional Utility U.S. Pat. No. 5,977,684 presented to Ted Lin on Nov. 2, 1999 for "Rotating Machine Configurable as True DC Generator or Motor"

09) Non-Provisional Utility U.S. Pat. No. 5,864,198 earned by Joseph Pinkerton on Jan. 26, 1999 for "Brushless Generator"

08) Non-Provisional Utility U.S. Pat. No. 5,587,618 issued to George Hathaway on Dec. 24, 1996 for "Direct Current Homopolar Machine"

07) Non-Provisional Utility U.S. Pat. No. 5,278,470 graced upon Zacharias Neag on Jan. 11, 1994 for "Homopolar Machine which acts as a Direct Current (DC) High Voltage Generator or Motor"

06) Non-Provisional Utility U.S. Pat. No. 5,241,232 honorably given to Jay Reed on Aug. 31, 1993 for "Homopolar Motor-Generator"

05) Non-Provisional Utility U.S. Pat. No. 5,011,821 published in the name of Charley McCullough on Apr. 30, 1991 for "Method and Apparatus for Generating Electricity"

04) Non-Provisional Utility U.S. Pat. No. 3,465,187 issued to Onezime Breaux on Sep. 2, 1969 for "Homopolar Generator Having Parallel Positioned Faraday Disk Structures"

03) Non-Provisional Utility U.S. Pat. No. 3,185,877 presented to Anthony Sears on May 25, 1965 for "Direct Current Homopolar Generator"

02) Non-Provisional Utility U.S. Pat. No. 645,943 graced upon inventor Gustaf Dalen on Mar. 27, 1900 for "Dynamo Electric Machine"

01) Non-Provisional Utility U.S. Pat. No. 406,968 bestowed upon none other than Nikola Tesla himself in 1889 for "Dynamo Electric Machine"

None of the prior art devices known to the applicant or his attorney disclose the EXACT embodiment of this inventor that constitutes a simple, elegant and affordable system for an orbiting Multi-Rotor Homopolar direct current electricity generation

Objectives

Unfortunately none of the prior art devices singly or even in combination provide for all of the objectives as established by the inventor for this system as enumerated below.

1. It is an objective of this invention to provide devices, method and system for generation of high power direct current electricity without commutation and rectification.
2. The primary objective of the invention is orbiting multi-rotor cylindrical magnets in rolling contact that eliminates friction while generating DC electricity.
3. Another objective of the invention is to provide high efficiency, low noise and low resistance in a high current generator.

4. Another objective of the invention is that it uses readily available materials in a dynamically balanced arrangement.

5. Another objective of the invention is safety through reduced internal stress than comparable homopolar machines with a single rotor.

6. Another objective of the invention is that it provides distributed generation around an air core.

7. Another objective of this invention is to provide an easy, quick, simple practical way to generate more efficient and cost effective direct current electricity.

8. Another objective of this invention is that it promote and encourage other inventors to do additional research in homopolar machines generally but co-rotational magnets and disk embodiments in particular.

9. Another objective of this invention is to provide a system that is integrated and flexible.

10. Another objective of this invention is to provide a system that is easily useable and requires little if any training for manufacturing and use.

11. Another objective of this invention is that it meet all federal, state, local and other private standards guidelines, regulations and recommendations with respect to safety, environment, and energy consumption.

12. Another objective of this invention is that it can be made from modular standard materials and components that are also easily maintainable.

Other objectives advantages and features of this invention reside in its simplicity, elegance of design, ease of manufacture, service and use and even aesthetics as will become apparent from the following brief description of the drawings and the detailed description of the best mode preferred embodiments taken in connection with the accompanying drawings.

DETAILED DESCRIPTION OF THE BEST MODE PREFERRED EMBODIMENT

Figure 1:
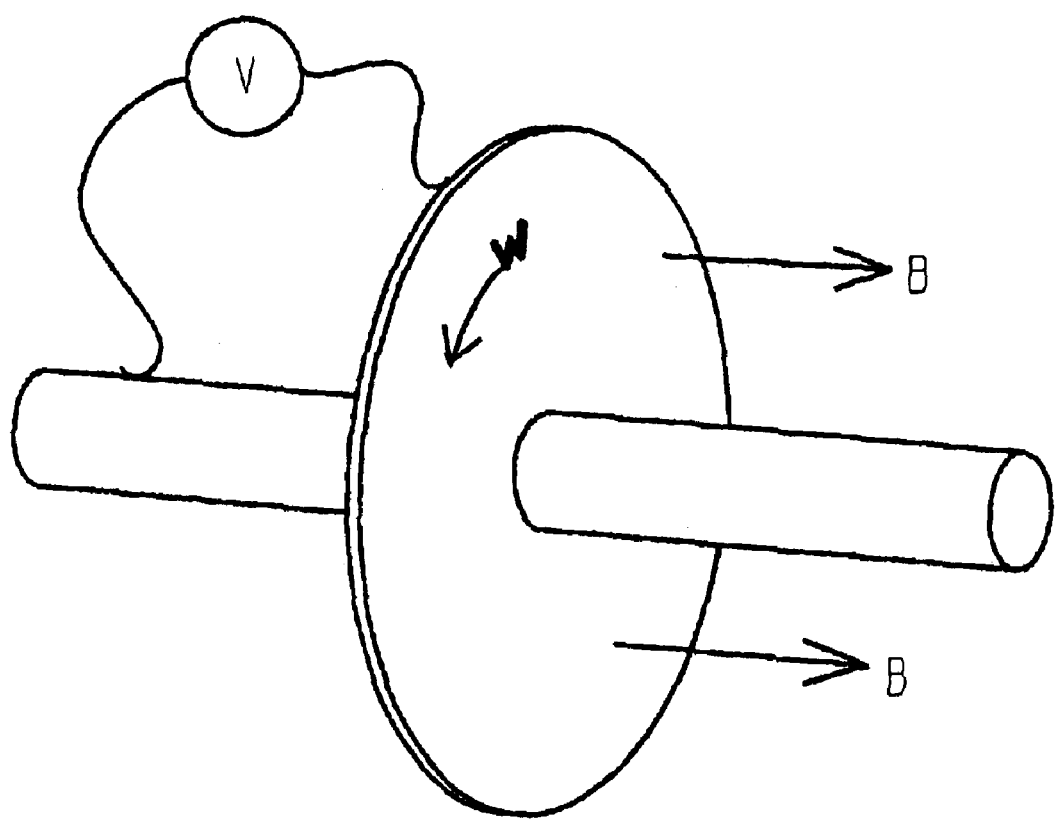
FIG. 1 is a prior art diagram of a typical homopolar generator.

As shown in the drawings wherein like numerals represent like parts throughout the several views, there is generally disclosed in FIG. 1 is a state of the prior art.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
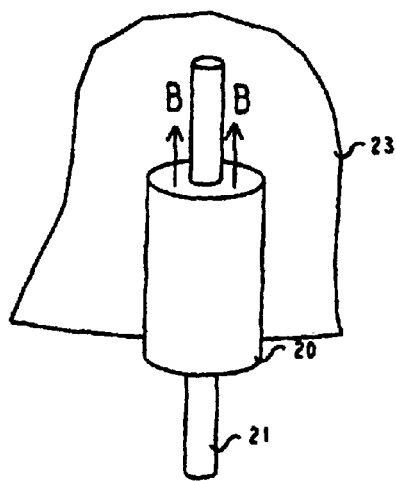
FIG. 2 is a perspective, cutaway view of the magnetized rotor and stator.

Turning first to FIG. 2 there is shown a perspective cutaway view of one embodiment of the present invention showing one of a multitude of rotors that are axially magnetized (B). This multitude mounted in parallel comprise the multi-rotor homopolar machine in close contact with a ring shaped stator that may be optionally magnetized in the direction opposite to the magnetic fields of the rotors.

Figure 3:
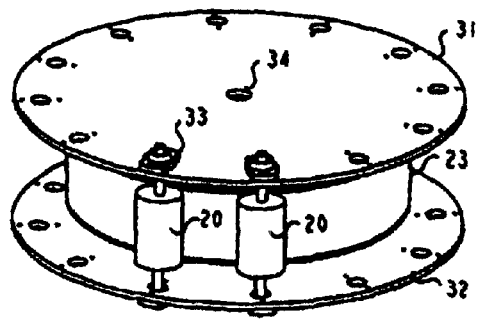
FIG. 3 is an elevational view of the complete orbiting multi-rotor machine.

Each rotor 20 has its own axle 21 which is circumferentially mounted vertically, arranged and dynamically balanced around a central vertical axis, on an electrically conductive but low permeability axle rod 21 made of copper, brass or bronze, that may penetrate the center of the entire magnetized rotor and rotatably attach to top and bottom bearing 33 on circular endplates 31, 32 shown in FIG. 3. In operation, the rotors orbit around the circular stator ring, which may or may not also be magnetized.

The invention is more completely shown in the elevational view of FIG. 3 with several rotors 20 rotatably attached to the top circular endplate 31 and bottom circular endplate 32 by electrically conductive bearings 33. The top endplate 31 is rigidly attached to the central axle 34 supporting the orbiting multi-rotor homopolar generator assembly. The hollow circular design of the stationary ring stator 23 is also visible in FIG. 3, which can be optionally magnetized to increase performance output.

Figure 4:
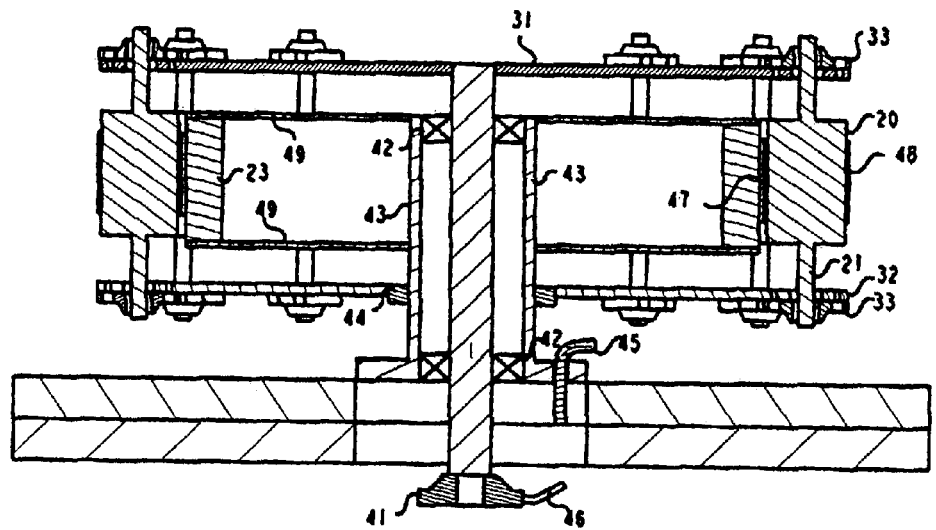
FIG. 4 is a cross sectional view of the invention.

The bottom circular endplate 32 has a large hole in the center, more completely seen in FIG. 4, that allows inner attachment to insulating bearing 44 which optimally can be a non-contacting, low friction magnetic bearing since the weight of the rotor assembly is carried by the electrically conductive thrust bearing 41. The bottom endplate 32 is thus isolated electrically from the stationary Inner cylinder 43 that is the inner core of the stator. Inner circular assembly plates 49 of equal size and shape, that preferably are electrically conductive, rigidly attach the inner cylinder 43 to the stator ring 23. In accordance with the present invention, FIG. 4 shows the side cross sectional view edge on with a cutaway so that the central axle 34 and hollow inner cylinder design 43 is visible.

The insulating bearings 42 separate the central axle 34 from the inner cylinder 43. Both bearings 42 and 44 electrically maintain the separation of polarity of the electromotive force (emf) voltage of each rotor. The positive or negative polarity of the conductors depends of course on the rotation direction of the rotor magnets. One conductor 45 is electrically emerging from the stator assembly and ultimately emanates from the outer edge of each rotor 20 with the homopolar effect conducting the generated electricity through the rolling means 47 and 48. The opposite polarity conductor 46 is electrically emanating from the center axle 21 of each rotor 20 is connected to the electrically conductive thrust bearing 41.

In accordance with an important function of the present invention, there is shown in FIG. 4 one embodiment of an intimately contacting and engaging nonslip rolling means 47 and 48. As is well-known in the industry where good traction with a high coefficient of friction (1.6 or better) but sufficiently low electrical resistance is desired between two surfaces, an adherent coating of copper can be used on both facing surfaces of the stator 23 and rotor 20. For the copper coating, electro-deposition can be used or flame spraying of copper on the rotor and stator outer surfaces.

Another embodiment of rolling means 47 and 48 utilizes a geared electromechanical rotary joint developed by NASA Goddard Space Center (*NASA Tech Briefs*, December, 1994) which offers the advantage of a springy, low noise planetary gear contacting a stator ring gear. It was designed by NASA to overcome the disadvantages of sliding contacts and to ensure high traction desired for rolling electrical contacts.

The springy gears are made from beryllium copper which is a self-cleaning material with, in one embodiment, an average diameter of 6.35 mm with any reasonable number of teeth. Another concept to creating a rolling contact utilizes a magnetic sprocket design with small rare earth (samarium cobalt for example) magnets embedded perpendicularly in the surfaces of the stator ring and rotor magnets. The magnetic sprocket thus utilizes equally spaced magnets mounted normal to the axes of the stator and rotor.

Figure 5:
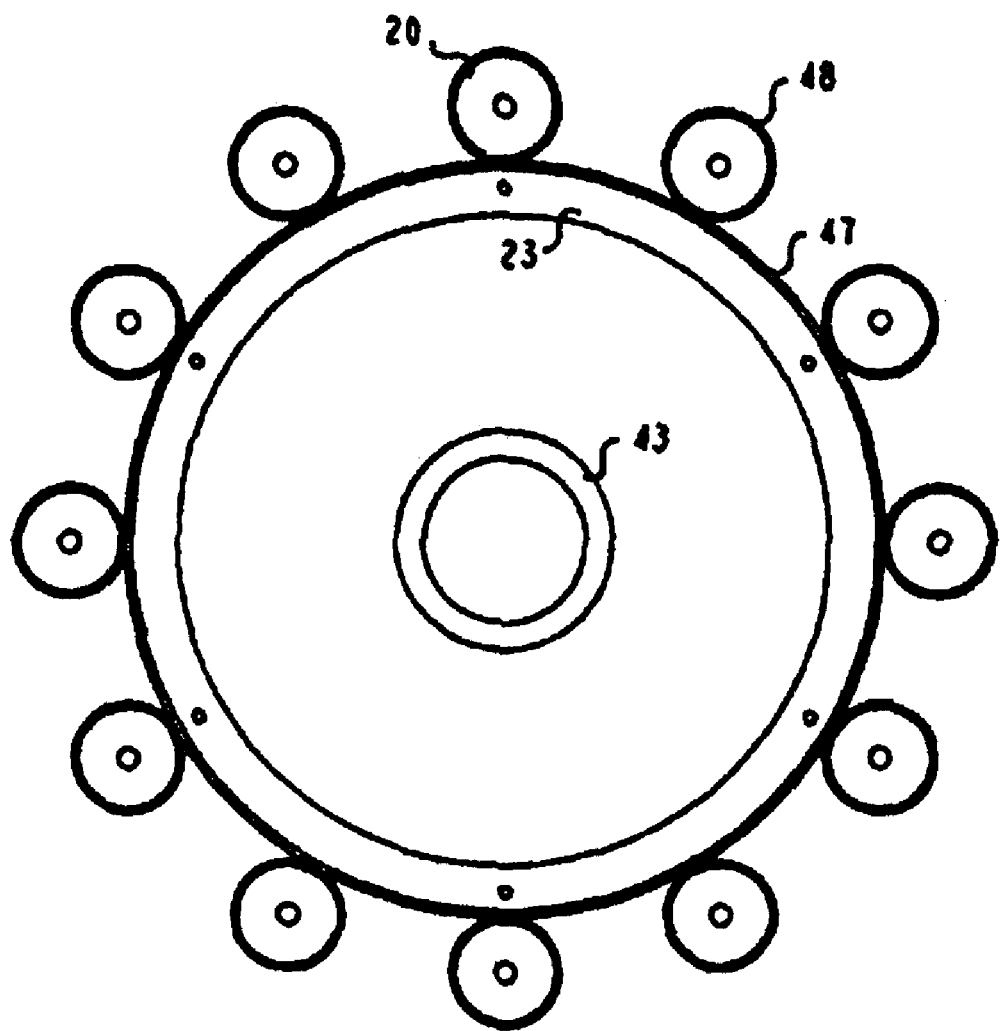
FIG. 5 is a plan view from the top of the invention.

To demonstrate an important feature of the invention, there is shown in FIG. 5 a plan view from the top of the balanced distribution of the rotors 20 around the stator assembly 43 with the outer stator ring 23 that are equally spaced and preferably dynamically balanced so the centrifugal forces are equal and opposite.

Theory of Operation

The main principle of operation is based on the fact that rotating cylindrical magnets creates a homopolar emf generation from Faraday's Law and the Lorentz Force. Physically, a rotating, non-inertial reference frame configuration can only be analyzed correctly with Einstein's general theory of relativity, utilizing a Thirring metric.

Particularly, where rotating cylindrical magnets and disk are synchronized and made co-rotational, such a co-rotational configuration makes the generator one piece like the earth's magnetic field itself. As the inventors explored this correspondence more closely, it was learned that the earth's molten, electrically conductive iron core also includes not one but several vortices in a coaxial circular arrangement. The inventors stumbled upon this concept while investigating the field rotation paradox and found that an orbiting, multi-rotor homopolar generator assembly would be analogous to the earth's electrically conductive, multi-vortex, magnetic, molten iron core.

The field rotation paradox can be easily resolved by an amateur DIY (Do It Yourself) scientist by comparing the interception of a linear magnetic field vs. a rotating magnetic field. In the former configuration the meter gives the same reading whether the magnet is moved with respect to a pickup coil of wire or vice versa but in the latter configuration the meter reading is seen only when the disk is moved with respect to rotary magnetic field of cylindrical magnet but not when the magnet is moved with respect to the disk. The former is consistent with special relativity while the latter is relying on general relativity. Both are loosely termed "relativistic."

Assembly and Use

The manufacturing, assembly and use of this invention is very simple even intuitive. The system of this invention can be readily assembled from the teaching provided in this disclosure by state of the art techniques and materials by a person of average skill in the art.

The applicant has described the essence of this invention. While this invention has been described with reference to an illustrative embodiment, this description is not intended to be construed in a limiting sense. Various modifications and combinations of the illustrative embodiments as well as other embodiments of the invention will be apparent to a person of average skill in the art upon reference to this description.

Variations

Due to the simplicity and elegance of the design of this invention designing around it is very difficult if not impossible. Nonetheless many changes may be made to this design without deviating from the spirit of this invention. Examples of such contemplated variations include the following:

1. The shape and size, colors etc of the device or the packaging thereof may be modified.
2. Additional complimentary and complementary functions and features may be added.
3. The system of this invention may be adapted for other related uses.
4. Instead of cylindrical magnets, other types of magnets and mode of mounting on the disk may be employed to create the orbiting, rotational magnetic field.
5. The invention may be scaled up and down by several orders of magnitude
7. An experimental science toy version may be developed for education and entertainment of little young scientists of the future.
8. Homopolar generator may be employed in reverse as a motor to convert electrical energy into mechanical energy.
9. A homopolar servo motor version may be crafted based on this co-rotational magnet and disk concept.
10. Permanent cylindrical magnets may be replaced by equivalent configuration of electromagnets.
11. A portion of the emf generated may be fed back to cylindrical electromagnets to explore the possibility of a self-excited generator without violating any laws of nature.

Other changes such as aesthetics and substitution of newer materials as they become available, which substantially perform the same function in substantially the same manner with substantially the same result without deviating from the spirit of the invention may be made.

Following is a listing of the components used in the best mode preferred embodiment and the alternate embodiments for use with OEM as well as retrofit markets. For the ready reference of the reader the reference numerals have been arranged in ascending numerical order.

10=Prior art generally
    20=Rotor(s)
    21=Axle, rod
    23=Stationary Ring Stator (Optionally Magnetized)
    31=Top circular end plate
    32=Bottom circular end plate
    33=Bearing
    34=Central Axle
    41=Electrically Conductive Thrust Bearing
    42=Insulating Bearing
    43=Stationary Hollow Inner Cylinder
    44=Insulating Bearing
    45=Opposite Polarity Conductor
    46=Opposite Polarity Conductor
    47=Non-Slip Rolling Means
    48=Non-Slip Rolling Means
    49=Inner Circular Assembly Plates Definitions and Acronyms A great care has been taken to use words with their conventional dictionary definitions. Following definitions are included here for clarification.

3D=Three Dimensional
    Acyclic=Non-cyclic, non rotational or linear
    DC=Direct Current as contrasted from alternating current electricity
    DIY=Do It Yourself
    DYNAMO=A device for converting mechanical energy into electrical energy (& Vice versa)
    EMF=Electromagnetic Force
    Homopolar=Same as unipolar
    Integrated=Combination of two entities to act like one
    Interface=Junction between two dissimilar entities
    N=Magnetic North (Permanent or electro-magnet)
    N-Machine=One Piece Faraday generator
    OEM=Original Equipment Manufacturer S=Magnetic South (Permanent or electro-magnet)
Unipolar=Same as homopolar Note: It should be noted that the prior art uses unipolar, homopolar, acyclic and Faraday Disk Dynamo interchangeably.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention as defined by the appended claims.

What is claimed is:

1. An orbiting multi-rotor homopolar machine comprising:
   a plurality of axially parallel, equally spaced, cylindrical, magnet rotors arranged circumferentially around the periphery of a central stator ring whose axis is parallel to each magnet rotor axis;
   rolling means attached separately to the magnet rotors and to the stator ring for intimately contacting and enabling high friction non-slip rolling between magnet rotors and stator ring;
   means for starting and sustaining orbiting rolling of the magnet rotors around stator ring as required;
   bearing means rotatably securing the top and bottom ends of each magnet rotor to a corresponding circular endplate;
   axle means located in the center of the stator ring rigidly attached to the top circular endplate;
   electrically insulating bearing means rotatably securing the center of the bottom circular endplate to a coaxial inner cylinder located between the axle and stator ring; and
   circular assembly means for rigidly attaching the inner cylinder to the stator ring.

2. The homopolar machine of claim 1 wherein the inner cylinder, circular assembly means, magnet rotors, axle means, circular endplate, and stator ring are made at least partially from electrically conductive material.

3. The homopolar machine of claim 1 wherein the rolling means comprises an electrically conductive geared electro-mechanical rotary joint.

4. The homopolar machine of claim 1 wherein the rolling means comprises an electrically conductive copper coating on the stator ring and magnet rotors.

5. The homopolar machine of claim 1 wherein the stator ring comprises electrically conductive magnetic material.

6. A method for starting and sustaining the orbiting of rolling cylindrical magnets arranged parallel to and circumferentially around the vertical axis of a central stator ring, while intimately contacting and engaging non-slip rolling means between rotor magnets and the stator ring, rotatably securing the top and bottom ends of each rotor magnet by means of a bearing to a corresponding circular endplate, rigidly attaching to the top circular endplate a vertical axle coaxial with and in the stator ring, securing the center of the bottom circular endplate to a coaxial inner cylinder located between the axle and the stator ring by means of an electrically insulating bearing, and rigidly attaching the inner cylinder to the stator ring by means of a circular assembly.

7. An orbiting multi-rotor homopolar machine comprising:
   a plurality of axially parallel, equally spaced, cylindrical, magnet rotors arranged circumferentially around the periphery of a central stator ring whose axis is parallel to each magnet rotor axis;
   rolling means attached separately to the magnet rotors and to the stator ring for intimately contacting and enabling high friction non-slip rolling between the magnet rotors and stator ring;
   means for starting and sustaining orbiting rolling of the magnet rotors around the stator ring as required;
   bearing means rotatably securing the top and bottom ends of each magnet rotor to a corresponding circular endplate;
   axle means located in the center of the stator ring rigidly attached to the top circular endplate;
   electrically insulating bearing means rotatably securing the center of the bottom circular endplate to a coaxial inner cylinder located between the axle and stator ring; and
   circular assembly means for rigidly attaching the inner cylinder to the stator ring; wherein said inner cylinder, said circular assembly means, said magnet rotors, said axle means, said circular endplate, and said stator ring are made at least partially from electrically conductive material.

8. The homopolar machine of claim 7 wherein the rolling means comprises an electrically conductive geared electro-mechanical rotary joint.

9. The homopolar machine of claim 7 wherein the rolling means comprises an electrically conductive copper coating on the stator ring and magnet rotors.

10. The homopolar machine of claim 7 wherein the stator ring comprises electrically conductive magnetic material.

* * * * *